(12) United States Patent
Da Palma et al.

(10) Patent No.: US 7,752,315 B2
(45) Date of Patent: Jul. 6, 2010

(54) METHOD FOR EXTENDING THE USE OF SIP (SESSION INITIATED PROTOCOL) FOR PROVIDING DEBUG SERVICES

(75) Inventors: William V. Da Palma, Coconut Creek, FL (US); Brett J. Gavagni, Sunrise, FL (US); Brien H. Muschett, Palm Beach Gardens, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/291,575

(22) Filed: Dec. 1, 2005

(65) Prior Publication Data

US 2007/0130345 A1 Jun. 7, 2007

(51) Int. Cl.
*G06F 15/16* (2006.01)
(52) U.S. Cl. .................... 709/227; 709/230
(58) Field of Classification Search .............. 709/230, 709/227
See application file for complete search history.

(56) References Cited

U.S. PATENT DOCUMENTS

| | | |
|---|---|---|
| 6,404,754 B1 | 6/2002 | Lim |
| 6,434,143 B1 | 8/2002 | Donovan |
| 6,512,818 B1 | 1/2003 | Donovan et al. |
| 6,567,399 B1 | 5/2003 | Schuster et al. |
| 6,601,099 B1 | 7/2003 | Corneliussen |
| 6,665,723 B2 | 12/2003 | Trossen |
| 6,735,621 B1 | 5/2004 | Yoakum et al. |
| 6,771,641 B1 | 8/2004 | Sollee et al. |
| 6,795,430 B1 | 9/2004 | Ong et al. |
| 6,813,264 B2 | 11/2004 | Vassilovski |
| 6,856,618 B2 | 2/2005 | Strathmeyer et al. |
| 6,870,848 B1 | 3/2005 | Prokop |
| 7,085,814 B1 * | 8/2006 | Gandhi et al. ............... 709/208 |
| 2003/0021290 A1 * | 1/2003 | Jones .......................... 370/466 |

(Continued)

OTHER PUBLICATIONS

Session Initiation Protocol—SIP—An Alcatel White Paper—Jul. 2003 http://www.facweb.iitkgp.ernet.in/~pallab/mob_com/AlcatelLucent_SIP_Whitepaper.pdf.*

*Primary Examiner*—Benjamin R Bruckart
*Assistant Examiner*—Noel Beharry
(74) *Attorney, Agent, or Firm*—Novak Druce + Quigg

(57) ABSTRACT

A method (200) for providing debug services between two SIP compliant endpoints is presented. The method extends SIP compliance by including a SIP DEBUG message (370). The method (200) extends the SIP protocol for allowing SIP compliant endpoints to configure themselves for providing debug capabilities. The endpoints can be a SIP client (110), a SIP server (120), or a SIP proxy (115). The method can include the steps of sending a SIP INVITE request from a first device to a second device to initiate a SIP session, receiving a SIP INVITE response from the second device, sending a SIP DEBUG request from the first device to the second device to initiate a debug session, receiving a SIP DEBUG response from the second device, and providing encrypted debugging services during the SIP session between the first SIP compliant device and the second SIP compliant device. The SIP DEBUG message can include a debug header field for invoking a method call on a second SIP compliant product which includes a list of variables accessible to the first SIP compliant product as a result of the method call.

9 Claims, 3 Drawing Sheets

U.S. PATENT DOCUMENTS

| | | | |
|---|---|---|---|
| 2003/0079199 A1* | 4/2003 | Barsness et al. | 717/100 |
| 2003/0217165 A1* | 11/2003 | Buch et al. | 709/229 |
| 2004/0010778 A1* | 1/2004 | Kaler et al. | 717/130 |
| 2004/0073658 A1* | 4/2004 | Oran et al. | 709/224 |
| 2004/0125757 A1 | 7/2004 | Mela et al. | |
| 2005/0043950 A1* | 2/2005 | Page | 704/270 |
| 2005/0091572 A1* | 4/2005 | Gavrilescu et al. | 715/500 |

* cited by examiner

METHOD FOR EXTENDING THE USE OF SIP (SESSION INITIATED PROTOCOL) FOR PROVIDING DEBUG SERVICES

BACKGROUND OF THE INVENTION

1. Technical Field

This invention relates to the field of telecommunications, and more particularly, the Session Initiated Protocol (SIP).

2. Description of the Related Art

Telecommunication systems can be time based or packet based. For example, a wireless telephone or cell phone can communicate using a time based technique such as CDMA. By contrast, the Internet is a packet based system which can support Internet Protocol (IP) telephony for allowing the real time delivery of voice and other multimedia services. Internet Telephony, also known as Voice over Internet Protocol (VoIP), allows for the conversion and transmission of voice data from a time based system into a packet based system. VoIP services are convenient in that they allow users to communicate through the Internet using a personal computer. VoIP services have also merged with the time based systems such as the standard PSTN to provide long distance telephony at reduced costs.

Internet technology is session based rather than connection based. The underlying foundation is an IP layer that makes a best effort to deliver packets, even though it provides unreliable connectionless service at the network level. SIP is an application-layer control (signaling) protocol for creating, modifying, and terminating sessions with one or more participants. SIP is generally used to establish an Internet session and negotiate the capabilities of the session. The sessions can include Internet telephone calls, multimedia distribution, and multimedia conferences. In general, SIP invitations are used to create sessions, and the invitations carry session descriptions that allow participants to agree on a set of compatible media types.

SIP provides signaling services for establishing and negotiating a secure and unsecured sessions but does not actually provide service offerings. Within the context of VoIP, SIP handles the call set up between devices and opens the lines, or streams, of communication. Once the session is established, SIP relinquishes control to the devices. However, during VoIP sessions, it may be occasionally, necessary to determine what actions are transpiring between the server and client. For example, during a VoIP interactive voice response (IVR) application, it may be advantageous for the client to determine if the server has properly interpreted or recognized a voice request. Debugging capabilities are not available or supported with the IETF RFC 3261 specification.

A SIP client can communicate with a SIP server to provide debug capabilities through the use of SIP MESSAGES. However, a SIP MESSAGE for debugging can only generally be used if the implementer of the SIP debugger is the same as the SIP server. What is needed is a means for standard debugging service that would allow for interoperability between SIP systems capable of supporting debug operations. Accordingly, there is a need, to provide a mechanism to SIP which allows for an interoperable session debugging service for application specific protocols that use SIP as a mechanism for session control. A need also exists, for enabling a SIP debugger for use on a SIP-enabled client that can debug any SIP compliant product.

SUMMARY OF THE INVENTION

The present invention extends the use of SIP (Session Initiated Protocol) to enable debugging services on a SIP-enabled device. A method, according to one embodiment of the invention, includes the steps of sending a SIP INVITE request from a first SIP compliant device to a second SIP compliant device to initiate a SIP session, and configuring the first SIP compliant device and the second SIP compliant device to provide debugging capabilities. The method can further include indicating a DEBUG method in an Allow header field of the SIP INVITE request. The DEBUG method can permit the second SIP compliant device to debug the first SIP compliant device. The method can further include receiving a SIP INVITE response from the second SIP compliant device, and identifying a SIP DEBUG method in an Allow header field of the SIP INVITE response. The DEBUG method can permit the first SIP compliant device to debug the second SIP compliant device. Notably, a SIP compliant device can support a SIP client, a SIP proxy, and a SIP server.

The step of providing debugging services can further include sending a SIP DEBUG request from the first SIP compliant device to the second SIP compliant device to initiate a debug session, and receiving a SIP DEBUG response at the first SIP compliant device from the said second SIP compliant device to acknowledge the debug session. The debug session can support at least one debug capability such as a method call invocation. For example, the debug capability can support VoIP debugging of a live telephone call. The debug capability can also support various modes such as variable watch, setting breakpoints, stepping through code, checking memory, de-referencing pointers, re-compiling code, and the like. In one aspect, the SIP DEBUG request can include a Debug header field for invoking a method call on the second SIP compliant device. The second SIP compliant device can respond to the method call with a SIP DEBUG response that can include a list of variables accessible to the first SIP compliant device as a result of the method call. For examples, the list of variables can be fields of the method call.

As a particular example of a VoiceXML debug session, the SIP DEBUG request can include Debug header fields such as Method, Component, and Action with corresponding values of GET_NAMES, VXML, and CONTROL. The field values can change depending on the debug session type. In this particular example, the SIP DEBUG reply can include a list of accessible variables such as a confidence, utterance, input mode, and interpretation in response to the GET_NAMES method call. For example, during a VoiceXML debugging session for evaluating voice recognition performance, a client can issue a SIP DEBUG request to return property names from a VoiceXML dialogue. The server can respond with the list of accessible variables which the client can check. For instance, the client can check the server's confidence score for determining how well the server recognized a voice command.

The SIP DEBUG request can include a Caller-ID header field for specifying a caller-ID to receive debug support. The debug session can then direct the debug capability to a device of the caller-ID. For example, the client can generate a SIP DEBUG request on behalf of a user for providing VoiceXML debugging of a VoIP call. The debugging can allow the client to access VoiceXML interpretation results processed by the server. The SIP DEBUG request can permit the client to query the server and request interpretation results the server determined during a current or prior VoiceXML session. For example, the server may provide voice recognition capabilities with results the user can query to determine a recognition performance on behalf of the user.

The SIP DEBUG request can further include an application method to identify a list of values associated with a list of variables at a unique event time. For example, the SIP DEBUG request can include a method call such as application.lastResult$ for returning variable list values corresponding to the last VoiceXML dialogue. For instance, during a debugging of a voice recognition dialogue, the application.lastResult$ method call can request valid named properties from the last voice recognition result with respect to a GET_NAMES method call.

The method can further include encrypting confidential sections of the SIP message using Secure/Multipurpose Internet Mail Extensions (S/MIME). For instance, the header name fields and the application method can contain sensitive information that a client or server can encrypt as a security precaution for sending information over the Internet.

A SIP debugger is also provided as a realization of the inventive method for providing SIP debugging services. The procedures for effecting the described steps can be included within a SIP debugger, which can reside within a SIP-enabled client. The debug capabilities can be interoperable over a SIP session between a SIP-enabled debugger and a SIP server. For example, SIP debugging can be provided over a SIP proxy connecting the SIP-enabled debugger and the SIP server. The SIP debugger can include a SIP compliant product supporting a debug capability, and a SIP DEBUG message for configuring the debug capability on the SIP compliant device or another SIP compliant device. The SIP debugger can communicate with the SIP compliant product for sending a SIP DEBUG message to a second SIP compliant product for configuring the debug capability between the two products.

The SIP DEBUG message when used as a request can include a Debug header field for invoking a method call on the second SIP compliant product. The SIP DEBUG message when used as a reply can include a list of variables accessible to the first SIP compliant product as a result of the method call. In one arrangement, the SIP DEBUG message can configure a client and server to provide VoiceXML debug interpretation services during a live VoiceXML SIP session. The VoiceXML debug session can include voice recognition interpretation. In one arrangement, the first SIP compliant product and said second SIP compliant product can be separated by a SIP proxy. The SIP debugger can provide interoperable debug capabilities through said SIP proxy by providing debug service translation across the SIP proxy.

A machine readable storage is also provided, having stored thereon a computer program having a plurality of code sections executable by a portable computing device for causing the portable computing device. To perform the steps of sending a SIP INVITE request from a first device to a second device to initiate a SIP session; receiving a SIP INVITE response from the second device; sending a SIP DEBUG request from the first device to the second device to initiate a debug session; receiving a SIP DEBUG response from the second device; and, providing encrypted debugging services during the SIP session between the first SIP compliant device and the second SIP compliant device.

The SIP INVITE request can identify a DEBUG method in an Allow header field of the SIP INVITE request, which permits the second device to debug said first device. The SIP DEBUG request can also identify whether the second device supports debugging capabilities. In one storage arrangement, the SIP DEBUG request includes a Debug header field for invoking a method call on the second device, the SIP DEBUG response including a list of variables accessible to said first device as a result of said method call. The SIP DEBUG request can include a Caller-ID header for specifying a caller-ID to receive debug support which directs the debug capability to a device of the caller-ID. The encrypted debugging services can include using S/MIME encoding for securing debug message bodies over an Internet connection.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Internet technology is session based rather than connection based. Resting on top of the IP layer is Transmission Control Protocol (TCP) and Universal Datagram Packet (UDP) for enabling communication services. TCP provides a connection oriented protocol that ensures reliable delivery of IP packets, in part, by performing sequencing operations. UDP provides a connectionless service that relies on higher layers to perform sequencing and sorting operations on the packets. UDP can be a preferable option to TCP for real-time voice delivery since less time and processing overhead is required to control packet delivery and the reassembly of packets. On top of UDP, a Real Time Protocol (RTP) provides end-to-end network transport functions suitable for VoIP. The RTP protocol features timing reconstruction, loss detection, security, and content identification. RTP does not provide packet loss recovery or forward error correction since it is itself transported on top of UDP.

The IP telephony architecture provides signaling capabilities that include H.323 and SIP (Session Initiated Protocol). The H.323 protocol provides a comprehensive set of functionalities for conducting multimedia sessions over an IP network. H.323 runs on top of TCP which requires more processing overhead and coordination. SIP is a competitive protocol to H.323 with more flexibility. SIP can run on TCP or UDP and is based on a client-server model that is capable of creating and terminating voice calls over the Internet. SIP is the Internet Engineering Task Force (IETF) protocol for VOIP as well as other text and multimedia sessions, like instant messaging, video, on-line games and other services.

Figure 1:
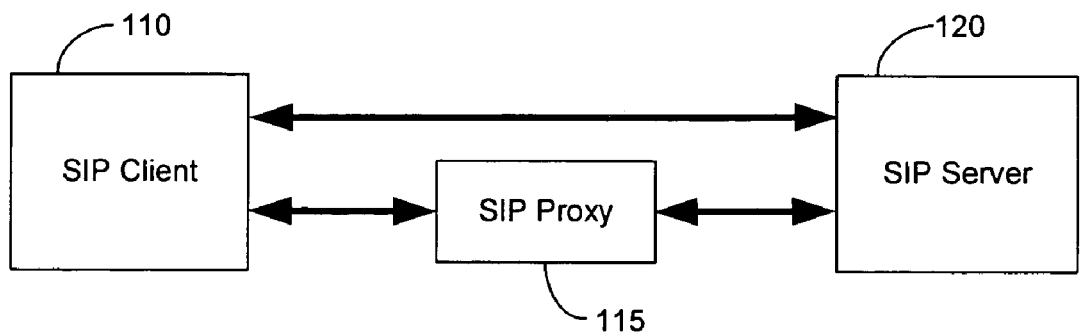
FIG. 1 is a block diagram illustrating signaling between SIP compliant devices in accordance with one embodiment of the invention.

Referring to FIG. 1, a SIP compliant service system 100 is schematically shown. The system 100 includes a SIP client 110, a SIP proxy 115, and a SIP server 120 in communication with one another. The SIP client 110 can communicate directly with the SIP server 120, or through the SIP proxy 115. The SIP server 120 can also be connected to other SIP compliant serves or SIP compliant devices. The SIP proxy 115 can also be a SIP server which can provide communication service translations between SIP compliant devices on different service systems. For example, when the SIP client 110 requests a connection to an IP-based destination device, the SIP server 120 can give the IP destination address to the SIP client 110, or establish a connection with the destination device and acts itself as the SIP proxy 115. The SIP server 120 can translate addresses and provide verification services, and can provide an encryption option when two devices are connected over an IP connection within the same service system.

The SIP client 110 can initiate a SIP call set up with the SIP server 120 directly with the server or through a SIP proxy, thereafter followed by a handshaking procedure to open a communication dialogue. The SIP procedure can handle the connection and negotiate the session content. Once a SIP session is established, the SIP client 110 can communicate with the SIP server. For example, the SIP client 110 can run a VoiceXML program to send and receive voice data in an XML format from the SIP server 120. The SIP server 120 can process the data and work with the SIP client to provide the requested voice service. SIP also makes use of proxy servers 115 to help route requests to a user's current location, authenticate and authorize users for services, implement provider call-routing policies, and provide features to users. SIP also provides a registration function that allows users to upload their current locations for use by proxy servers.

The present invention extends the SIP protocol by providing debug services between SIP compliant devices. More particularly, the invention can establish debugging capabilities between the SIP client 110 and a SIP server 120 during the SIP session. For example, the debugging service permits the SIP client and SIP server to debug one another for improving interoperability or communication between the two devices for improving the quality of service.

The IETF RFC 3261 specification does not support debug capabilities which could allow for debug status inquiry. A SIP MESSAGE can provide an interface between a debugger and a SIP proxy. A SIP INFO can serve as an interface between a SIP Proxy and a SIP server for bridging debug capabilities between the debugger and SIP server through the proxy. A SIP server can interpret a header field in the SIP INFO message to initiate a debug request. SIP debug messages can be sent between the server and debugger residing on the client through the SIP INFO message. The SIP INFO message can require configuring of the intermediate elements such as the SIP proxy to recognize SIP INFO and SIP MESSAGE. A non-configured SIP proxy supports standard SIP specification methods which do not generally include the SIP INFO or SIP MESSAGE.

Figure 2:
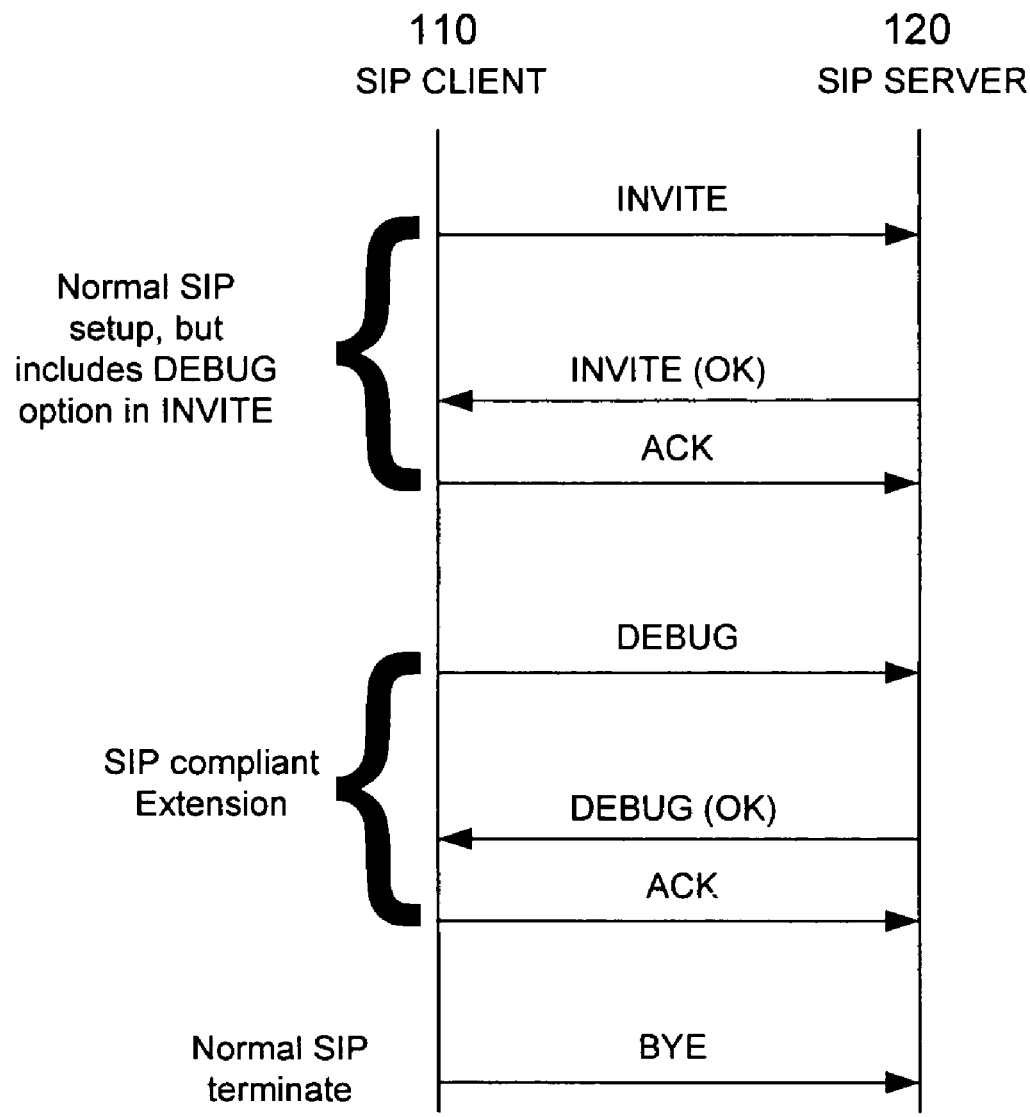
FIG. 2 is a call flow diagram of a DEBUG SIP session in accordance with one embodiment of the invention.

Referring to FIG. 2 a signaling path diagram is presented to illustrate how the SIP protocol can be extended to support a "debug" function. In the SIP protocol extension for supporting debugging, a call setup for starting a conversation session begins with an INVITE message. The INVITE message is sent to the SIP server when the SIP client 110 wants to communicate with another SIP-compliant device or the SIP server directly. For example, the SIP client 110 can communicate with the SIP server 120 for receiving a multimedia service such as connecting a call using VoIP. A SIP client can register its IP address with a SIP server to participate in an IP based communication session such as VoIP. For example, a wireless device can have an associated IP address which is a unique alphanumeric packet address such as SIP:// my_phone@network.com. When the originating client device requests a connection to another IP designation device, such as another wireless phone client, the SIP server can provide the destination IP address to allow a direct communication session, of the SIP server can act as a proxy for passing communication between the two devices.

In the preferred embodiment, the SIP client 110 establishes a SIP session directly with the SIP server 120. The SIP server 120 can accept the invitation by sending an OK message, which the SIP client 110 receives, and then sends an ACK message to acknowledge commencement of a SIP session. FIG. 2 also illustrates how the SIP protocol can be extended to support a "debug" service. For brevity, only the INVITE and BYE messages are shown between the client and server. SIP defines six types of requests, which are also referred to as methods. The first method is the INVITE method which invites a user to a conference. The second method is the ACK method which allows a client to acknowledge an INVITE request, thereby providing reliable message exchange for invitations. A successful SIP invitation includes an INVITE request followed by an ACK request. The third message is the BYE method which indicates to a server that the call should be released and terminates a connection between two parties or users in conference. The fourth message is the CANCEL method is used to cancel a previous request by a client. The fifth message is the OPTIONS method which solicits information about capabilities and does not assist with establishment of a call. For example, this allows a client to discover information about the supported methods, content types, extensions, codecs, etc., without "ringing" the other party. The sixth method is the REGISTER method which provides information about a client's location to a SIP server For the purpose of describing one embodiment of the present invention, an example set of message syntaxes are defined as follows in accordance with FIG. 2.

The SIP RFC 3261 Standard describes the methods that are supported in the SIP session. For example, an Augmented Backus-Naur Form (BNF) for the SIP Protocol from SIP Standard Section 25 is:

```
Method = INVITEm / ACKm / OPTIONSm / BYEm
 / CANCELm / REGISTERm
 / extension-method
extension-method = token
```

The "/extension-method" option within the Augmented BNF notation allows for the recognition and exchange of the /DEBUG method within the SIP INVITE message. Referring to FIG. 2, the SIP client 110 can send an INVITE request to the SIP server 120 within an INVITE message body as shown below; sections which are provided in accordance with one embodiment of the invention are presented in bold face font.

```
C->S
    INVITE sip:wvs@9.22.74.34:5070 SIP/2.0
    Via: SIP/ 2.0/ UDP 9.22.74.34:5060 ;
    From: "bgavagnilt" <sip:bgavagni@9.22.74.34:5060> ;tag=158196d8
    To: <sip:wvs@9.22.74.34:5070>
    Call-ID: 360814221-43699757@9.22.74.34
    Allow: INVITE, OPTIONS, BYE, CANCEL, ACK, REFER,
    NOTIFY, INFO, DEBUG
    CSeq: 1 INVITE
    User-Agent: Ahead SIPPS IP Phone Version 2.0.46.24
    Expires: 180
    Accept: application/sdp
    Content-Type: application/sdp
    Content-Length: 239
    Contact: <sip:bgavagni@9.22.74.34>
    Max-Forwards: 70
    ...
```

The entry <INVITE sip:wvs@9.22.74.34:5070 SIP/2.0> above establishes an IP session using SIP 'INVITE' between two user agents. For example, the SIP client 110 can represent a first user agent, and the SIP server 120 can represent a second user agent. The call set up between the client 110 and server 120 is a relatively normal procedure though it allows extension for the DEBUG method. One aspect of the invention is modifying the SIP RFC 3261 Standard to support the DEBUG method. One notable change to the original SIP INVITE request is the inclusion of the DEBUG method within the Allow header field. For example, the entry <Allow: INVITE, OPTIONS, BYE, CANCEL, ACK, REFER, NOTIFY, INFO, DEBUG> includes the /DEBUG method to state that the client 110 allows the server 120 to perform debug operations on the client.

The Allow header field within the SIP INVITE request reveals what methods the SIP client 110 will allow the SIP server 120 to perform on the client. For example, the Allow: CANCEL allows the server 120 to cancel a last request. Notably, the INVITE message includes a DEBUG method in the Allow field of the INVITE message. For example, the Allow: DEBUG allows the server 120 to debug the client. The DEBUG method is subject to the constraints of an established SIP dialog. The Allow header field allows a SIP User Agent to indicate the capability of receiving DEBUG requests for enabling and configuring debug services.

However, the INVITE request message does not provide an option to request debugging services for the client on the server. It strictly informs the server that the client will support debug capabilities and allow the server to debug the client. Notably, the server can respond with a SIP INVITE request to inform the client that debug capabilities are supported on the server. Notably, either the client or the server can initiate the SIP DEBUG dialogue for establishing debug services. The SIP server 120 can respond to the SIP INVITE request with a SIP INVITE (OK) response. The message body of the SIP INVITE response is shown; sections which are provided in accordance with one embodiment of the invention are shown in bold face font:

---

S->C
SIP/2.0 200 OK
To: <sip:wvs@9.22.74.34:5070>
From: "bgavagnilt" <sip:bgavagni@9.22.74.34:5060>;tag=158196d8
Via: SIP/2.0/UDP 9.22.74.34:5060;
Call-ID: 360814221-43699757@9.22.74.34
Allow: INVITE, OPTIONS, BYE, CANCEL, ACK, REFER, NOTIFY, INFO, DEBUG
CSeq: 1 INVITE
Content-Length: 0
Max-Forwards: 70

---

The SIP INVITE response can itself include a DEBUG within the Allow header field of the message. The DEBUG included within the reply informs the client that the server will support debugging capabilities and will permit the client to debug the server. Notably, the CSeq indicates a corresponding sequence of 1 with the SIP INVITE request from the client 110. Notably, the Call-ID within the SIP INVITE request also references the same Call-ID within the SIP INVITE response. The Call-ID field indicates the identity of the connection and accordingly the device that is to receive debug services.

One aspect of the invention introduces a SIP DEBUG method extension to the SIP protocol. Referring to FIG. 2, the client 110 sends a SIP DEBUG message upon completion of call setup which was arranged through the SIP INVITE messages. The SIP DEBUG method provides for the exchange of debugging services by configuring the server and client to support debugging capabilities. For example, upon completion of call setup using the SIP INVITES, the client and the server have permitted each other to provide debugging services. However, the client and server have not enacted any functionality which allows them to commit the debug service offering. The SIP DEBUG method provides the enabling method calls and responses which allow the client and server to provide debugging capabilities.

For the purpose of describing the exchange of SIP DEBUG messages, an example set of message body syntaxes are defined within the context of a VoiceXML application. Referring to FIG. 2, the SIP DEBUG request from the client 110 to the server 120 is presented below. The message body illustrates the usage of the SIP DEBUG extension in order to facilitate the application specific VoiceXML interpretation debug protocol.

---

C->S
DEBUG sip:wvs@9.22.92.102 SIP/2.0
Via: SIP/2.0/UDP palmant.ibm.com
From: William <sip:wpalma@palmant.ibm.com >
To: WebSphere Voice Server <sip:wvs@9.22.92.102>
Call-ID: 5@palmant.ibm.com
CSeq: 2 DEBUG
Method: GET-NAMES
Component: VXML
Action: CONTROL
Content-Type: text/plain; charset=ISO-8859-4
Content-Length: 23
application.lastresult$

---

Notably, the SIP DEBUG message is identified with a DEBUG header. Notably, the CSeq is 2 indicating a second message sequence between the client and server, and that the message is of type DEBUG. The SIP DEBUG includes a Method header field, a Component header field, and an Action header field. The method header field includes the actual name of a method for invoking the method call on the SIP server. The component field can specify the session content type, or dialogue type, and the action field can specify the debug operation. The SIP DEBUG message is not limited to providing these three header types, but rather can support other header types which can be recognized and interpreted by a SIP compliant debugger. In the VoiceXML application example, the GET_NAMES method can request the server to return property names from a VoiceXML dialogue for the specified Call-ID, which specifies the client that is requesting the debug service. Accordingly, the server supports a method call GET_NAMES which produces a list of property names available to the client. The message body can also include an application method such as application.lastresult$ to identify the list of values associated with the list of variables at a unique event time. For example, within the VoiceXML application, the application.lastresult$ can request valid property names from the last input (recognition) result in view of the GET_NAMES method being invoked on the server. The application method can itself specify a method call or a field to assist the server in responding to the DEBUG message.

Referring to FIG. 2, the SIP DEBUG response from the server 110 to the client 110 is presented below. The message body illustrates the usage of the SIP DEBUG extension in order to facilitate the application specific VoiceXML interpretation debug protocol.

---

S->C
  SIP/2.0 200 OK
  Via: SIP/2.0/UDP palmant.ibm.com
  From: William <sip:wpalma@palmant.ibm.com >
  To: WebSphere Voice Server <sip:wvs@9.22.92.102>
  Call-ID: 5@palmant.ibm.com
  CSeq: 2 DEBUG
  Content-Type: text/plain; charset=ISO-8859-4

-continued

```
Content-Length: 75
Result: confidence,utterance,inputmode,interpretation
```

Notably, the value of <CSeq: 2 DEBUG> indicates that the message is a second sequence response between the client and server, and the DEBUG type confirms the configuration between the devices is for a debugging service. The SIP DEBUG response message can also include a Result field which provides the list of variables the client can obtain in response to the SIP DEBUG request. For example, within the VoiceXML application, the server 120 can be providing voice recognition services during the SIP session. The server 120 may not be processing the client's voice requests as expected. Accordingly, the client 110 would like to know the status of the voice recognition requests at the server. The client 110 can issue a SIP DEBUG message to commence a debugging service during the VoiceXML application to evaluate performance at the server 120. As previously exemplified, the client can issue a GET_NAMES request in the method field of the SIP DEBUG request. In one arrangement, the debug capability supports VoIP debugging of a live telephone call.

The server can respond to the GET_NAMES request by providing a list of variables the server uses when performing voice recognition tasks. For example, the server can respond with the results: confidence, utterance, inputmode, interpretation. This allows the server to inform the client of the variables the client can obtain through the result field. For example, the confidence variable can have a value which reveals the confidence in the voice recognition result at the server. The utterance variable can be the utterance the voice recognition system on the server recognized. For example, the client can check the utterance to determine if the server recognized the correct word. The input mode can describe the voice encoding format, and the interpretation can reveal the semantics associated with the recognized utterance. Those skilled in the art can appreciate that the results are not limited to the results presented in the VoiceXML example. Various multimedia sessions between the client and the server can have their own domain of debugging terminologies.

The Session Initiation Protocol specification (RFC 3261) details optional support for the use of S/MIME (Secure Multipurpose Internet Mail Extensions), also known as S/MIME (RFC 2633). The use of S/MIME for securing message bodies is a standard security mechanism reference in the SIP protocol specification. An Advanced Encryption Standard (AES) can be used for content encryption in S/MIME which is a fast and secure algorithm with comparatively low memory requirements making it suitable for use in mobile or embedded devices. Multipurpose Internet Mail Extensions (MIME) specifies how messages must be formatted so that they can be exchanged between different email systems. The secure version of MIME, S/MIME, is defined to support encryption of email messages. S/MIME provides cryptographic security services for electronic messaging applications including authentication, message integrity and non-repudiation of origin and privacy and data security. S/MIME can be used by traditional mail user agents (MUAs) to add cryptographic security services to mail that is sent, and to interpret cryptographic security services in mail that is received. S/MIME is not restricted to mail and it can be used with any transport mechanism that transports MIME data, such as HTTP. As such, S/MIME takes advantage of the object-based features of MIME and allows secure messages to be exchanged in mixed-transport systems.

In one embodiment of the invention, a feature for securing confidential sections of the debugging service over the Internet can be provided. The SIP DEBUG messages can be securely transmitted using an encryption format such as S/MIME during the SIP session. For example, sections that contain confidential or user sensitive information can be encrypted within the SIP DEBUG message. For example the VoiceXML examples previously provided unencrypted debug transmission services which can be secured using encryption. The usage of S/MIME for securing message bodies as an encryption technique is the standard security mechanism reference in the SIP protocol specification, and can be leveraged in the DEBUG extension method. The following is an example of a secure DEBUG message exchange from client to server for the previously presented Voice XML application (the encrypted section is bounded by asterisk lines):

```
C->S
    DEBUG sip:wvs@9.22.92.102 SIP/2.0
    Via: SIP/2.0/UDP palmant.ibm.com
    From: William <sip:wpalma@palmant.ibm.com >
    To: WebSphere Voice Server <sip:wvs@9.22.92.102>
    Call-ID: 5@palmant.ibm.com
    CSeq: 2 DEBUG
    Method: GET-NAMES
    Component: VXML
    Action: CONTROL
    Content-Type: multipart/signed;protocol="application/pkcs7-
    signature";micalg=sha1; boundary=boundary_line
    Content-Length: 568
    --boundary_line
    ******************************************** Data encrypted*******
    Content-Type: text/plain; charset=ISO-8859-4
    Content-Length: 23
    application.lastresult$
    *******************************************************************
    --boundary_line
    Content-Type: application/pkcs7-signature; name=smime.p7s
    Content-Transfer-Encoding: base64
    Content-Disposition: attachment;
    filename=smime.p7s;handling=required
```

```
ghyHhHUujhJhjH77n8HHGTrfvbnj756tbB9HG4VQpfyF467GhlGfHfYT6
4VQpfyF467GhlGfHfYT6jH77n8HHGghyHhHUujhJh756tbB9HGTrfvbnj
n8HHGTrfvhJhjH776tbB9HG4VQbnj7567GhlGfHfYT6ghyHhHUujpfyF4
7GhlGfHfYT64VQbnj756
--boundary_line
```

The SIP DEBUG request can encrypt the application method application.lastresult$ which provides a secure handle to access confidential results within the server. The encryption produces a shell around the sensitive data which includes support code. The shell begins at Content-Type: and terminates at the last—boundary_line. The sequence of random looking variables represents an encryption key for decoding the encrypted data.

Similarly, confidential sections of the SIP DEBUG message from the server 120 to the client 110 can be encrypted with the S/MIME format. The invention does not limit the encryption to the S/MIME format. Various other encryption formats are available for use within a SIP session to secure sensitive information. An example of the encrypted message body of the SIP DEBUG response is shown below.

servers, clients and clients, and servers and servers. The inventive methods extend the SIP protocol for allowing SIP compliant endpoints to configure themselves for providing debug capabilities. The method can be embodied within a code storage having stored thereon a computer program having a plurality of code sections executable by a portable computing device for causing the portable computing device to perform the steps of sending a SIP INVITE request from a first device to a second device to initiate a SIP session, receiving a SIP INVITE response from said second device, sending a SIP DEBUG request from said first device to said second device to initiate a debug session, receiving a SIP DEBUG response from said second device, and providing encrypted debugging services during said SIP session between said first SIP compliant device and said second SIP compliant device.

```
S->C
    SIP/2.0 200 OK
    Via: SIP/2.0/UDP palmant.ibm.com
    From: William <sip:wpalma@palmant.ibm.com >
    To: WebSphere Voice Server <sip:wvs@9.22.92.102>
    Call-ID: 5@palmant.ibm.com
    CSeq: 2 DEBUG
    Content-Type: multipart/signed;protocol="application/pkcs7-
    signature";micalg=sha1; boundary=boundary_line
    Content-Length: 500
    --boundary_line
    ******************************************************* Data encrypted******
    Content-Type: text/plain; charset=ISO-8859-4
    Content-Length: 75
    Result: confidence,utterance,inputmode,interpretation
    ***************************************************************************
    --boundary_line
    Content-Type: application/pkcs7-signature; name=smime.p7s
    Content-Transfer-Encoding: base64
    Content-Disposition: attachment;
    filename=smime.p7s;handling=required
    ghyHhHUujhJhjH77n8HHGTrfvbnj756tbB9HG4VQpfyF467GhlGfHfYT6
    4VQpfyF467GhlGfHfYT6jH77n8HHGghyHhHUujhJh756tbB9HGTrfvbnj
    n8HHGTrfvhJhjH776tbB9HG4VQbnj7567GhlGfHfYT6ghyHhHUujpfyF4
    7GhlGfHfYT64VQbnj756
    --boundary_line
```

With regard to the VoiceXML application, the results from the server can encrypt using the S/MIME format. Results such as confidence, utterance, input mode, and interpretation may be confidential. A user of the debugging service may want to ensure secure communications during the SIP session. The SIP DEBUG message automatically identifies portions of the message that are confidential based on the defined structure of the SIP DEBUG message. The SIP DEBUG message includes an encryption option selectable by a user to secure the debug service application methods and results.

Figure 3:
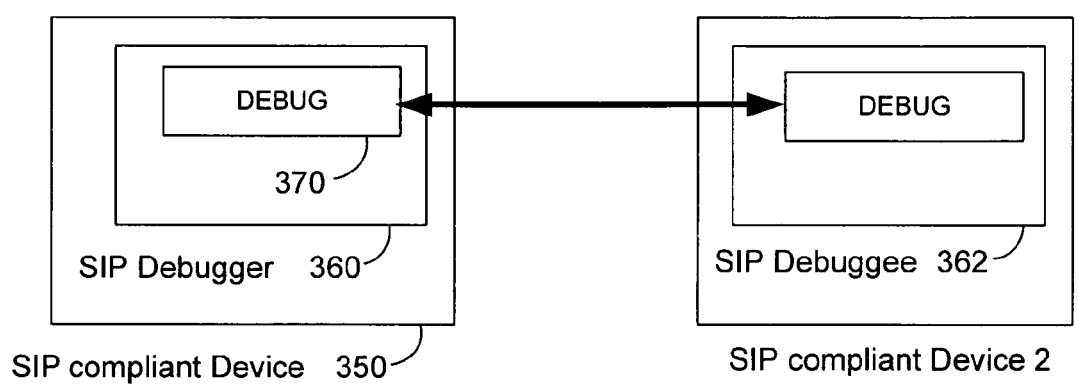
FIG. 3 is a SIP debugger in accordance with one embodiment of the invention.

The embodiment of the invention has presented a method for providing debug services between two SIP compliant endpoints. The endpoints can be a SIP client, a SIP server, or a SIP proxy. The inventive method extends SIP compliance by including a SIP DEBUG message. The method of the invention allows for debugging services between clients and Referring to FIG. 3, a SIP debugger for realizing the methods of the inventions for providing SIP debugging services according to another embodiment is schematically illustrated: The SIP debugger 360 can include a SIP compliant product 350 supporting a debug capability, and a SIP DEBUG message 370 for configuring said debug capability. The SIP Debugger 360 resides within a SIP compliant device 350. For example the SIP debugger 360 communicates with another SIP compliant product for sending a SIP DEBUG message 370 to a second SIP compliant product for configuring a debug capability between the first SIP compliant product and the second SIP compliant product. The SIP debugger can be a section of code, such as a java servlet, residing in a client application or on a server. The client application can be on a mobile device or any other communication device. The SIP debugger can configure the device for receiving or requesting method calls. The SIP debugger 360 can establish a SIP session for debugging services on a SIP debugee 362 using the SIP DEBUG method extension. The SIP DEBUG message includes a Debug header field for invoking a method call on a SIP compliant product. For example, the SIP DEBUG message configures a client and server to provide VoiceXML debug interpretation services during a live VoiceXML SIP session. The SIP Debugger can be used to debug a live VoIP call or a live VoiceXML application. The SIP Debugger can also be used for a variable watch or setting of a breakpoint. For example, the SIP Debugger can be used to debug code on a second device remotely from a first device. The act of providing a variable watch or setting a breakpoint using a SIP Debugger allows the first device to step through and observe the execution of code on the second device. The SIP debugger can be placed on a client and a server that are separated by a SIP proxy. A SIP debugger on the client can communicate directly with a SIP debugger on the server without requesting debug translation services by the SIP proxy. The SIP DEBUG is incorporated within a standard SIP dialogue thereby making a standard debug capability available to SIP-enabled devices. The SIP DEBUG allows interoperability between SIP-enabled devices which enables a standard debugging service for application specific protocols that utilize SIP as a mechanism for session control.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for extending the SIP (Session Initiated Protocol) to enable debugging services between SIP compliant devices comprising the steps of:
   sending a SIP INVITE request from a first SIP compliant device to a second SIP compliant device to initiate a SIP session, the SIP INVITE request including an Allow header field, wherein the Allow header field of the SIP INVITE request reveals methods that the first SIP compliant device allows the second SIP compliant device to perform on the first SIP compliant device, wherein the methods in the Allow header field of the SIP INVITE request includes a DEBUG method, and wherein the DEBUG method permits the second SIP compliant device to debug the first SIP compliant device by invoking a method call on the first SIP compliant device;
   receiving at the first SIP compliant device a SIP INVITE response from said second SIP compliant device, the SIP INVITE response including an Allow header field, wherein the Allow header field of the SIP INVITE response reveals methods that the second SIP compliant device allows the first SIP compliant device to perform on the second SIP compliant device, wherein the methods in the Allow header field of the SIP INVITE response includes a DEBUG method, and wherein the DEBUG method permits the first SIP compliant device to debug the second SIP compliant device by invoking a method call on the second SIP compliant device;
   sending a SIP DEBUG request from the first SIP compliant device to the second SIP compliant device to initiate a debug session, the SIP DEBUG request including a Method header field, a Component header field, and an Action header field, wherein the Method header field includes the actual name of a method for invoking the method call on the second SIP compliant device, the Component header field specifies a session content type, and the Action header field specifies an debug operation; and
   receiving at the first SIP compliant device a SIP DEBUG response from the second SIP compliant device, the SIP DEBUG response including a Result file that provides a list of variables obtainable by invoking the method call on the second SIP compliant device; and
   wherein the first and second SIP compliant devices can be one of a SIP client, a SIP proxy, and a SIP server.

2. The method of claim 1,
   wherein an exchange of DEBUG information during the debug session is limited to the first and second SIP compliant devices.

3. The method of claim 1,
   wherein said debug session supports at least one debug capability.

4. The method of claim 3, wherein said debug capability supports VoIP debugging of a call placed over a telephone.

5. The method of claim 3, wherein said SIP DEBUG request includes a Caller-ID header field for specifying a caller-ID to receive debug support, wherein said debug session directs said debug capability to a device of said caller-ID.

6. The method of claim 1, wherein said SIP DEBUG request further includes an application method to identify a list of values associated with said list of variables at a unique event time.

7. The method of claim 1, further including:
   encrypting confidential sections of a SIP message using Secure/Multipurpose Internet Mail Extensions (S/MIME).

8. A system for extending the SIP (Session Initiated Protocol) to enable debugging services between SIP compliant devices comprising:
   a first SIP compliant device and a second SIP compliant device, each supporting debugging capabilities, wherein the first and second SIP compliant devices can be one of a SIP client, a SIP proxy, and a SIP server, wherein the first and second SIP compliant devices are configured to:
   send a SIP INVITE request from a first SIP compliant device to a second SIP compliant device to initiate a SIP session, the SIP INVITE request including an Allow header field, wherein the Allow header field of the SIP INVITE request reveals methods that the first SIP compliant device allows the second SIP compliant device to perform on the first SIP compliant device, wherein the methods in the Allow header field of the SIP INVITE request includes a DEBUG method, and wherein the DEBUG method permits the second SIP compliant device to debug the first SIP compliant device by invoking a method call on the first SIP compliant device;

receive at the first SIP compliant device a SIP INVITE response from said second SIP compliant device, the SIP INVITE response including an Allow header field, wherein the Allow header field of the SIP INVITE response reveals methods that the second SIP compliant device allows the first SIP compliant device to perform on the second SIP compliant device, wherein the methods in the Allow header field of the SIP INVITE response includes a DEBUG method, and wherein the DEBUG method permits the first SIP compliant device to debug the second SIP compliant device by invoking a method call on the second SIP compliant device;

send a SIP DEBUG request from the first SIP compliant device to the second SIP compliant device to initiate a debug session, the SIP DEBUG request including a Method header field, a Component header field, and an Action header field, wherein the Method header field includes the actual name of a method for invoking the method call on the second SIP compliant device, the Component header field specifies a session content type, and the Action header field specifies an debug operation; and receive at the first SIP compliant device a SIP DEBUG response from the second SIP compliant device, the SIP DEBUG response including a Result file that provides a list of variables obtainable by invoking the method call on the second SIP compliant device.

9. A machine readable non-transitory storage, having stored thereon a computer program having a plurality of code sections executable by a portable computing device for causing the portable computing device to perform the steps of:

sending a SIP INVITE request from a first SIP compliant device to a second SIP compliant device to initiate a SIP session, the SIP INVITE request including an Allow header field, wherein the Allow header field of the SIP INVITE request reveals methods that the first SIP compliant device allows the second SIP compliant device to perform on the first SIP compliant device, wherein the methods in the Allow header field of the SIP INVITE request includes a DEBUG method, and wherein the DEBUG method permits the second SIP compliant device to debug the first SIP compliant device by invoking a method call on the first SIP compliant device;

receiving at the first SIP compliant device a SIP INVITE response from said second SIP compliant device, the SIP INVITE response including an Allow header field, wherein the Allow header filed of the SIP INVITE response reveals methods that the second SIP compliant device allows the first SIP compliant device to perform on the second SIP compliant device, wherein the methods in the Allow header field of the SIP INVITE response includes a DEBUG method, and wherein the DEBUG method permits the first SIP compliant device to debug the second SIP compliant device by invoking a method call on the second SIP compliant device;

sending a SIP DEBUG request from the first SIP compliant device to the second SIP compliant device to initiate a debug session, the SIP DEBUG request including a Method header field, a Component header field, and an Action header field, wherein the Method header field includes the actual name of a method for invoking the method call on the second SIP compliant device, the Component header field specifies a session content type, and the Action header field specifies an debug operation; and receiving at the first SIP compliant device a SIP DEBUG response from the second SIP compliant device, the SIP DEBUG response including a Result file that provides a list of variables obtainable by invoking the method call on the second SIP compliant device; and wherein the first and second SIP compliant devices can be one of a SIP client, a SIP proxy, and a SIP server.

* * * * *